United States Patent
Wu et al.

(10) Patent No.: US 10,427,942 B2
(45) Date of Patent: Oct. 1, 2019

(54) GRAPHENE DISPERSION PASTES, METHODS OF PREPARING AND USING THE SAME

(71) Applicant: Enerage Inc., Wujie Township, Yilan County (TW)

(72) Inventors: Mark Y. Wu, Wujie Township, Yilan County (TW); Cheng-Yu Hsieh, Wujie Township, Yilan County (TW); Fang-Ru Shen, Wujie Township, Yilan County (TW); Geng Wei Lin, Wujie Township, Yilan County (TW); Jing-Ru Chen, Wujie Township, Yilan County (TW)

(73) Assignee: ENERAGE INC., Wujie Township, Yilan County (TW)

( * ) Notice: Subject to any disclaimer, the term of this patent is extended or adjusted under 35 U.S.C. 154(b) by 3 days.

(21) Appl. No.: 15/868,283

(22) Filed: Jan. 11, 2018

(65) Prior Publication Data
US 2019/0119116 A1   Apr. 25, 2019

(30) Foreign Application Priority Data
Oct. 25, 2017  (TW) .............................. 106136611 A

(51) Int. Cl.
*H01B 1/04* (2006.01)
*C01B 32/194* (2017.01)
*C09J 9/02* (2006.01)

(52) U.S. Cl.
CPC ............... *C01B 32/194* (2017.08); *C09J 9/02* (2013.01); *H01B 1/04* (2013.01); *C01P 2004/11* (2013.01);
(Continued)

(58) Field of Classification Search
CPC ....... C01B 32/194; C09J 9/02; C01P 2006/22; C01P 2004/11; C01P 2004/13; H01B 1/04
See application file for complete search history.

(56) References Cited

U.S. PATENT DOCUMENTS

2015/0333320 A1    11/2015   Tamaki et al.
2017/0312695 A1 *  11/2017   Majumder ........... B01D 61/027
(Continued)

FOREIGN PATENT DOCUMENTS

| CN | 101864098 B |   | 1/2012 |
| CN | 106185895 A | * | 12/2016 |
| CN | 106221128 A |   | 12/2016 |

OTHER PUBLICATIONS

Atif, Rasheed, et al., "Reasons and remedies for the agglomeration of multilayered graphene and carbon nanotubes in polymers", Beilstein Journal of Nanotechnology, 2016, pp. 1174-1196, Bielstein-Institut zur Förderung der Chemischen Wissenschaften.
(Continued)

*Primary Examiner* — Mark Kopec
*Assistant Examiner* — Jaison P Thomas
(74) *Attorney, Agent, or Firm* — Muncy, Geissler, Olds & Lowe, P.C.

(57) ABSTRACT

A graphene dispersion paste has a viscosity in a range from 50,000 to 350,000 cps and a scraper fineness less than 20 μm, and includes graphene sheets, a solvent and a first polymer, wherein the graphene sheets have a bulk density in a range from 0.005 to 0.05 g/cm$^3$, a thickness in a range from 0.68 to 10 nm, and a plane lateral dimension in a range from 1 to 100 μm. The present application further provides methods of preparing and using the graphene dispersion paste.

10 Claims, 7 Drawing Sheets

(52) U.S. Cl.
CPC ...... *C01P 2004/13* (2013.01); *C01P 2006/22* (2013.01)

(56) References Cited

U.S. PATENT DOCUMENTS

| | | | |
|---|---|---|---|
| 2018/0010260 A1* | 1/2018 | Hersam | C09D 5/24 |
| 2018/0134902 A1* | 5/2018 | Wu | C09D 1/00 |
| 2019/0031513 A1* | 1/2019 | Zhou | C01B 32/184 |
| 2019/0067700 A1* | 2/2019 | Wu | H01M 4/625 |

OTHER PUBLICATIONS

Morimoto, Naoki, et al., "Tailoring the Oxygen Content of Graphite and Reduced Graphene Oxide for Specific Applications," Scientific Reports, 6, 21715; doi: 10.1038/srep21715, Feb. 25, 2016, pp. 1-8.

* cited by examiner

GRAPHENE DISPERSION PASTES, METHODS OF PREPARING AND USING THE SAME

CROSS-REFERENCE TO RELATED APPLICATION

This application claims the priority of Taiwanese patent application No. 106136611, filed on Oct. 25, 2017, which is incorporated herewith by reference.

BACKGROUND OF THE INVENTION

1. Field of the Invention

The present application relates to a graphene dispersion paste, which can keep graphene sheets evenly dispersed therein for a long time, and methods of preparing and using the same.

2. The Prior Arts

Andre Geim and Konstantin Novoselov at University of Manchester in U.K. successfully obtained single layer graphene by utilizing tape to exfoliate graphite in 2004, the graphene mainly is a two-dimensional crystal structure of hexagonal honeycomb arrangement consisting of $sp^2$ hybrid orbital, a thickness thereof is only 0.335 nm, namely, a diameter size of a carbon atom. The specific gravity of graphene is only about a quarter of the steels, a mechanical strength thereof can be hundreds times higher than steels, the graphene is the material having the strongest mechanical strength, so that the graphene having electrical conductivity, thermal resistance, chemical resistance, and other excellent properties is continuously applied to various fields by industries.

However, the most common problem in practical application is that graphene sheets are hard to be evenly dispersed, and easily gather and stack to agglomeration; even the graphene sheets are dispersed, they will re-aggregate in a short time. Therefore, to prevent the graphene sheets from agglomeration to obtain a graphene powder having even dispersion and fewer layers always is the technical bottleneck most needed to be solved in the industry.

Patent No. CN101864098B discloses a preparation method of a polymer/graphene composite master batch, which includes following steps: adopting ultrasonic wave or grinding to evenly disperse the graphite oxide into a polymer emulsion; introducing a reducing agent into the polymer emulsion for in situ reduction, enabling the graphite oxide to be reduced into the grapheme; carrying out demulsification, agglomeration and drying to obtain the polymer/grapheme composite master batch. However, in addition a research (Rasheed Atif, Fawad Inam, Beilstein Journal of Nanotechnology. 2016, 7, 1174-1196) pointed out that the ultrasonic process is less suitable for liquid having high viscosity; the reduced graphene will re-aggregate by impact of solvent volatilization during the step of drying the polymer emulsion containing the solvent and reduced graphene.

Patent No. CN106221128A discloses a method for preparing a carbon fiber composite material, which includes following steps: a matrix resin and a filler (e.g. graphene) is pre-heated to 30~150° C., uniformly dispersing the modified filler in the matrix resin; grinding the mixture with a mill several times; cooling the mixture to room temperature to obtain a modified resin; preparing a carbon fiber prepreg with the modified resin and carbon fibers by a hot-melt prepreg machine; thermoforming the laid carbon fiber prepreg to obtain the carbon fiber composite material. However, according to this method, the graphene as the modified filler in the matrix resin will aggregate during the cooling step, that causes the modified resin not having the expected performance.

Patent Publication No. US20150333320A1 discloses a method for manufacturing positive electrode active material/graphene composite particles, which includes following steps: mixing/pulverizing graphene oxide having functional group on surface thereof and positive electrode active material particles in a mixing machine to obtain a precursor particle; reducing the precursor particle by thermal reduction method or reducing agent to obtain a positive electrode active material/graphene composite particles. There is a research (Naoki Morimoto, Takuya Kubo, Yuta Nishina, Scientific Reports 6, 2016, 21715) pointed out more the functional groups on the surface of reduced graphene oxide that denotes higher oxygen content and lower electrical and thermal conductivity thereof. Therefore, in the aforesaid method, the relative ratio of functional groups and oxygen content of the graphene must be strictly controlled by temperature and reducing atmosphere, the graphene with higher oxygen content is less prone to agglomeration, but loses the properties of graphene.

It can be known from the aforesaid prior art, the current graphene dispersion techniques are limited to specific materials or operating conditions, the graphene temporarily dispersed probably enhance the performance of other materials, but the graphene mixed with other materials must be kept dispersed status for a certain period time in practical application, so as to be utilized by the industries.

SUMMARY OF THE INVENTION

In an aspect to solve the aforesaid problems of the prior art, the present application provides a method of preparing a graphene dispersion paste including: mixing and stirring graphene sheets, a solvent and a polymer to form a pseudo-plastic non-Newtonian fluid, wherein each the graphene sheet is consisting of 2 to 30 stacked graphene layers, and has a bulk density in a range from 0.005 to 0.05 g/cm$^3$, a thickness in a range from 0.68 to 10 nm, and a lateral size in a range from 1 to 100 μm; and applying a pressure not less than 10 bar to the pseudo-plastic non-Newtonian fluid, allowing the pseudo-plastic non-Newtonian fluid pass through a slit of a clearance not greater than 1000 μm at least two times, then forming a graphene dispersion paste, wherein a viscosity of the pseudo-plastic non-Newtonian fluid passing through the slit is in a range from 10 to 10,000 cps, and a viscosity of the graphene dispersion paste is in a range from 50,000 to 350,000 cps.

In an embodiment, the graphene sheets accounts for 0.05 to 20 wt % of total weight of the pseudo-plastic non-Newtonian fluid.

In an embodiment, each surface of the graphene sheets has a functional group represented by Rx-R'y, R is selected from at least one of benzene ring, pyridine and triazine, R' is selected at least one of amino, alkoxyl, carbonyl, carboxyl, acyloxyl, amido, alkoxylene, dimethylamino and alkoxylenecarboxyl, $1 \leq x \leq 4$, and $1 \leq y \leq 6$.

In an embodiment, the pressure is sequentially increased in a range from 10 to 30 bar, and the clearance of the slit is sequentially decreased in a range from 1000 to 10 μm.

In an embodiment, the aforesaid method of preparing the graphene dispersion paste further includes: heating the graphene dispersion paste at a temperature in a range from 30 to 200° C., reducing the viscosity of the graphene dispersion paste in a range from 50,000 to 10,000 cps, and discharging bubbles in the graphene dispersion paste of reduced viscosity by centrifugal force.

In another aspect, the present application provides a graphene dispersion paste, having a viscosity in a range from 50,000 and 350,000 cps and a scraper fitness not greater than 20 μm, and including: graphene sheets, a solvent and a first polymer, wherein the graphene sheets accounts for 0.05 to 20 wt % of total weight of the graphene dispersion paste, and each the graphene sheet has a bulk density in a range from 0.005 to 0.05 g/cm$^3$, a thickness in a range from 0.68 to 10 nm, and a lateral size in a range from 1 to 100 μm.

In a further aspect, the present application further provides a method of using a graphene dispersion paste including: preparing a graphene dispersion paste according to the aforesaid method, the graphene dispersion paste having a viscosity in a range from 50,000 and 350,000 cps and a scraper fitness not greater than 20 μm, and including graphene sheets, a solvent and a first polymer, wherein each the graphene sheet has a bulk density in a range from 0.005 to 0.05 g/cm$^3$, a thickness in a range from 0.68 to 10 nm, and a lateral size in a range from 1 to 100 μm; diluting the graphene dispersion paste to form a graphene dispersion solution of a viscosity not greater than 50,000 cps; applying the graphene dispersion solution to a substrate, allowing the graphene sheets dispersedly descend over a surface of the substrate; and curing the graphene dispersion solution, allowing the graphene sheets adhered to the surface of the substrate by the first polymer.

In an embodiment, the graphene dispersion paste is diluted with a solvent or a second polymer compatible with the first polymer to form the graphene dispersion solution; after the graphene dispersion solution is cured, the graphene sheets are adhered to the surface of the substrate by the first polymer and the second polymer.

In an embodiment, during the step of diluting the graphene dispersion paste, a conductive filler is further added in the graphene dispersion paste to form the graphene dispersion solution; after the graphene dispersion solution is cured, the graphene sheets connect with the conductive filler to form an electric conductive network.

The method according to the present application utilizes the fluid properties of polymer, the pseudo-plastic non-Newtonian fluid having a viscosity greater than 50,000 cps is formed by mixing the graphene sheets and the polymer, an pressure in a range from 10 to 30 bar is applied to the pseudo-plastic non-Newtonian fluid, to allow the pseudo-plastic non-Newtonian fluid pass a slit having a clearance in a range from 10 to 1000 μm at least two times, the viscosity of the polymer is suddenly decreased under an action of high shear force that is formed by the slit so as to evenly disperse the graphene sheets; the polymer, which passed through the slit and restored the original viscosity, can effectively prevent the graphene sheets from agglomeration, and keep the graphene sheets in dispersed status for a long time. On using the graphene dispersion paste of the present application, the viscosity of the graphene dispersion paste can be adjusted by adding a solvent or a compatible polymer, and flowing direction and velocity of the graphene sheets can be controlled thereby, so that the graphene sheets can be dispersedly adhered to a surface of a material. Accordingly, the graphene dispersion paste truly has practical industrial utilization to be used for technical fields of fiber, rubber, electrochemistry and others.

DETAILED DESCRIPTION OF PREFERRED EMBODIMENTS

The technical features and other advantages of the present application will become more readily apparent to those ordinarily skilled in the art, by referring the following detailed description of embodiments of the present application in conjunction with the accompanying drawing. In order to further clarify the technical means adopted in the present application and the effects thereof, the figure schematically illustrates the relative relationship between the main elements, but is not based on the actual size; therefore, thickness, size, shape, arrangement and configuration of the main elements in the figure are only for reference, not intended to limit the scope of the present application.

The physical properties of polymers change along with molecular sizes, molecular structures, additives, processing conditions and other factors, when a fluid polymer is forced to flow, it shows phenomenon of liquid viscosity and solid elasticity (i.e. viscoelasticity), rather than a property of common Newton fluids which viscosity is not affected by shear force. Under the action of high shear force, the viscosity of polymers rapidly decrease to present fluidity approximate to Newton fluids; when the shear force is gone, the polymers restore the original viscosity and present the viscoelasticity of non-Newtonian fluid. Therefore, the present application utilizes the fluid properties of the polymer to disperse and preserve the graphene sheets.

Figure 1:
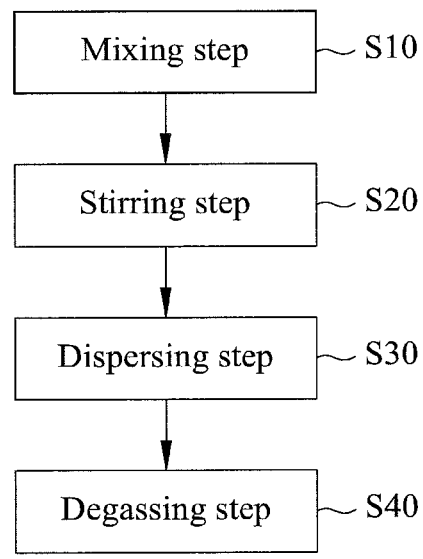
FIG. 1 is a flow chat illustrating steps of a method of preparing a graphene dispersion paste of the present application.

FIG. 1 is a flow chat illustrating steps of a method of preparing a graphene dispersion paste of the present application. As shown in FIG. 1, the method of preparing a graphene dispersion paste includes: a mixing step S10, mixing graphene sheets, a solvent and at least a polymer to form a mixture; a stirring step S20, stirring the mixture to form a pseudo-plastic non-Newtonian fluid of the graphene sheets and the polymer; a dispersing step S30, applying a pressure to the pseudo-plastic non-Newtonian fluid, allowing the pseudo-plastic non-Newtonian fluid pass through a slit at least two times, then forming a graphene dispersion paste; and a degassing step S40, discharging gas in the graphene dispersion paste.

Figure 2:
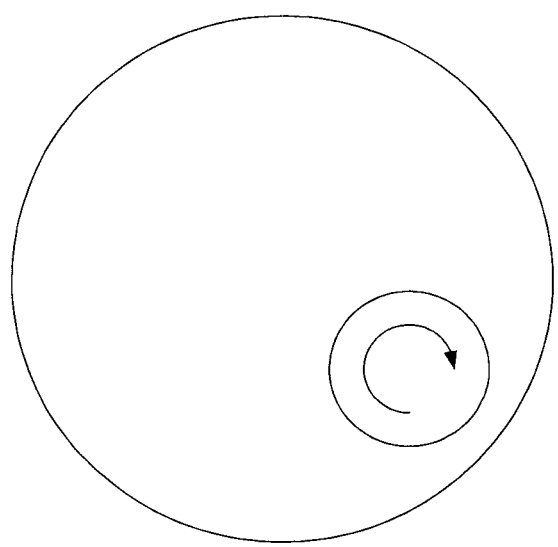
FIG. 2 schematically illustrates the mixing step of the method of preparing the graphene dispersion paste of the present application.

FIG. 2 schematically illustrates the mixing step of the method of preparing the graphene dispersion paste of the present application. As shown in FIG. 2, in the mixing step S10, a graphene solution and the polymer (not shown) are sequentially added into a mixing apparatus (e.g. homogenizers, mixers, etc.), and a non-fluidity mixture having a viscosity in a range from 100,000 to 1,000,000 cps is formed.

The graphene solution includes graphene sheets and a solvent, wherein each the graphene sheet is consisting of 2 to 30 stacked graphene layers, and has a bulk density in a range from 0.005 to 0.05 g/cm$^3$, a thickness in a range from 0.68 to 10 nm, and a lateral size in a range from 1 to 100 μm; the solvent is, for example, N-methyl pyrrolidinone (NMP) or isophorone. The polymer is selected from oily, thermoplastic and thermosetting polymers, is liquid state or dissolved in a solvent (i.e. a liquid mixture), and has a viscosity in a range from 300 to 900,000 cps. Due to high oil absorption characteristic of the graphene sheets, the viscosity of the mixture of the graphene sheets and the polymer will be rapidly increased, the higher viscosity of the used polymer is, the lower proportion of the graphene sheets added into the mixture is; therefore, the graphene sheets accounts for 0.05 to 20 wt % of total weight of the mixture.

For increasing the dispersibility of the graphene sheets in the polymer, a dispersant or surface modified graphene sheets can be further added therein. The dispersant is selected from siloxane, polyvinylpyrrolidone, sulfates and ester compounds. The surface modified graphene sheets can be formed by selecting a surface modifier adsorbed on the surface of the graphene sheets with π-π bonds stacking, the surface modifier has a chemical formula Rx-R'y, wherein R is selected from at least one functional group having quasi-hexagonal ring structure of benzene ring, pyridine and triazine, R' is selected at least one functional group of amino, alkoxyl, carbonyl, carboxyl, acyloxyl, amido, alkoxylene, dimethylamino and alkoxylene carboxyl, $1 \leq x \leq 4$, $1 \leq y \leq 6$. The functional groups of the surface modifier make mutual repulsion of the graphene sheets in the polymer, so as to increase the dispersion stability of the graphene sheets, and the functional groups formed on the surface of the graphene sheets can form chemical bonding with the polymer, to enhance interface strength between the graphene and the polymer, and to increase the mechanical strength of the polymer.

Figure 3:
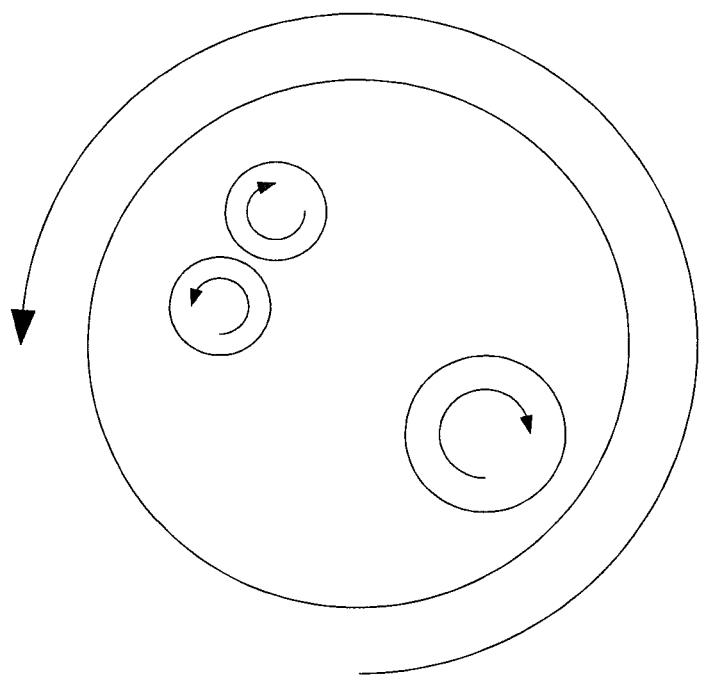
FIG. 3 schematically illustrates the stirring step of the method of preparing the graphene dispersion paste of the present application.

FIG. 3 schematically illustrates the stirring step of the method of preparing the graphene dispersion paste of the present application. As shown in FIG. 3, a stirring apparatus (e.g. three-axis planetary mixers) includes at least a rotation homogenization mechanism and at least a revolution homogenization mechanism, a speed of the rotation homogenization mechanism is in a range from 100 to 30,000 rpm, a speed of the revolution homogenization mechanism is in a range from 100 to 30,000 rpm, the speeds of the rotation homogenization mechanism and the revolution homogenization mechanism are respectively controlled by two individual control units, so as to form maximum shear force. In the stirring step S20, the mixture of the graphene sheets and the polymer are placed in the stirring apparatus, the graphene sheets are initially dispersed in the polymer by using the high shear force produced by the stirring apparatus, and the pseudo-plastic non-Newtonian fluid of the graphene sheets and the polymer is formed, a viscosity of the pseudo-plastic non-Newtonian fluid is in a range from 50,000 to 350,000 cps.

Figure 4:
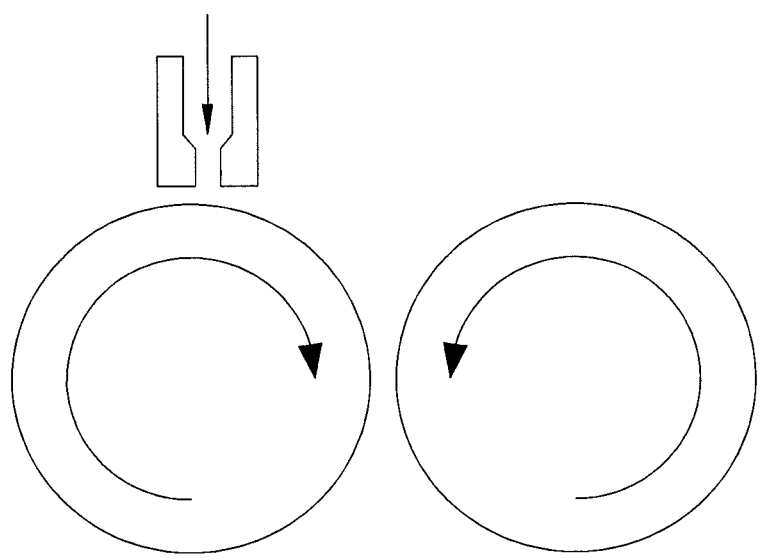
FIG. 4 schematically illustrates the dispersing step of the method of preparing the graphene dispersion paste of the present application.

FIG. 4 schematically illustrates the dispersing step of the method of preparing the graphene dispersion paste of the present application. As shown in FIG. 4, a dispersing apparatus (e.g. three roller machines) can apply a pressure in a range from 10 to 30 bar to a mixture material of high viscosity, to allow the mixture material pass through a slit having a clearance in a range from 10 to 1000 μm at a flowing velocity in a range from 0.1 to 10 L/min, so that an evenly dispersed mixture is formed. In the dispersing step S30, the pseudo-plastic non-Newtonian fluid of the graphene sheets and the polymer is dug from the stirring apparatus and placed in the stirring apparatus, by using the dispersing apparatus to perform dispersion processing of the pseudo-plastic non-Newtonian fluid several times, a graphene dispersion paste is formed. Due the shear force produced by the high pressure and the slit allow the viscosity of the pseudo-plastic non-Newtonian fluid be rapidly reduced in a range from 10 to 10,000 cps, the pseudo-plastic non-Newtonian fluid of reduced viscosity has fluidity in the slit (i.e. flowing velocity increased), and the aggregated graphene sheets are separated by the action of shear force, the separated graphene sheets are further dispersed along with the fluid of increased velocity; after the pseudo-plastic non-Newtonian fluid passed through the slit, due that the shear force was gone, the pseudo-plastic non-Newtonian fluid restores original viscosity, and can drag the graphene sheets to prevent the agglomeration thereof, so that a stable graphene dispersion paste is formed.

In the dispersing step S30, the pressure and the clearance of the slit can be sequentially adjusted, so as to further increase the separation and dispersion effect of the graphene sheets. In an embodiment, a first dispersing process includes conditions of: the pressure set in a range from 10 to 25 bar and the clearance of the slit set in a range from 100 to 1000 μm, under the conditions, the viscosity of the pseudo-plastic non-Newtonian fluid passing through the slit is in a range from 100 to 10,000 cps, the flowing velocity of passing through the slit is in a range from 0.1 to 5 L/min, a bigger agglomeration of the graphene sheets can pass through the slit of greater clearance, then be separated into several smaller agglomeration of the graphene sheets, so as to prevent the slit from clogging; a second dispersing process includes conditions of: the pressure increased in a range from 15 to 30 bar, the clearance of the slit decreased in a range from 10 to 200 μm, under the conditions, the viscosity of the pseudo-plastic non-Newtonian fluid passing through the slit is in a range from 10 to 1,000 cps, the flowing velocity of passing through the slit is in a range from 0.5 to 10 L/min. The sequentially increased shear force can completely separate the agglomeration of graphene sheets from big to small, an acceleration effect produced by the sequentially decreased slit can evenly disperse the graphene sheets, and the pseudo-plastic non-Newtonian fluid of restored viscosity can steadily keep the dispersion status of the graphene sheets.

Figure 5:
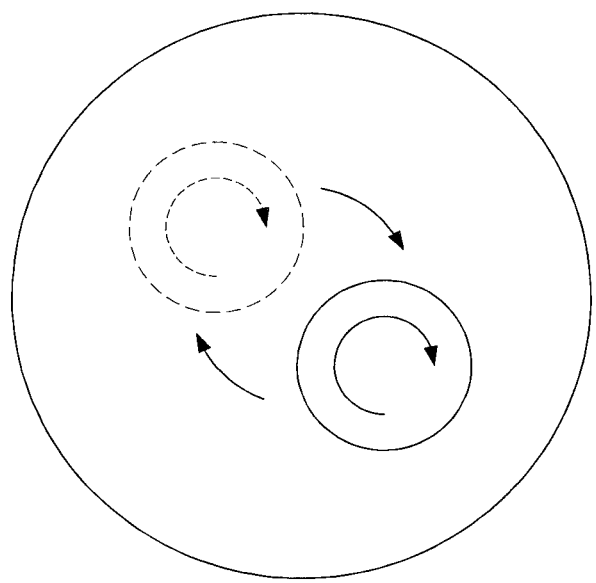
FIG. 5 schematically illustrates the degassing step of the method of preparing the graphene dispersion paste.

During mixing and dispersing the graphene sheets and the polymer, gas or bubbles probably retain therein. FIG. 5 schematically illustrates the degassing step of the method of preparing the graphene dispersion paste. As shown in FIG. 5, a degassing apparatus (e.g. centrifugal machines) has a heating mechanism and a rotating mechanism, gas or bubbles in a high viscosity material can be removed by heating and centrifugal force. In the degassing step S40, the graphene dispersion paste is placed in the degassing apparatus, the degassing step includes conditions of: a temperature set in a range from 30 to 200° C., and a rotating speed set in a range from 200 to 2000 rpm; the viscosity of the graphene dispersion paste is reduced in a range from 10,000 to 50,000 cps by increasing temperature, the gas or bubbles is promoted to be discharged with the centrifugal force, and thus the graphene dispersion paste can be prevent from holes in application.

It is worthy to mention that the graphene dispersion paste of the present application can keep the dispersion status and characteristics of the graphene sheets for a long time, and be prone to store and transport. A scraper fitness gauge can be used for testing dispersion status of a material in composite materials, and the smaller value indicates a higher dispersion. With the scraper fitness gauge to practically test the graphene dispersion paste and a graphene resin only dispersed by a revolution/rotation machine, a measured value of the graphene dispersion paste is less than 20 μm (more specifically, 5-15 μm), and a measured value of the graphene resin only dispersed by a revolution/rotation machine is not less than 25 μm, the difference thereof probably is that the graphene sheets in such graphene resin stack again to graphite due to certain agglomeration or uneven dispersion occurred. It can be known that the graphene sheets are evenly dispersed in the graphene dispersion paste of the present application, and do not occur serious agglomeration.

The graphene dispersion paste of the present application can be widely applied to the technical fields of fiber composite materials, rubber composite materials, current collecting layers and electrode materials of electrochemistry devices, anti-static coatings, anti-corrosion coatings, and others.

Figure 6A:
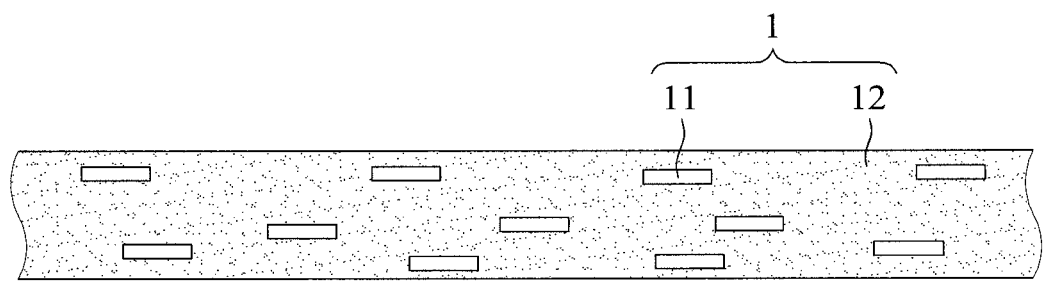
FIGS. 6A, 6B and 6C schematically illustrate steps of a method of using the graphene dispersion paste of the present application.
Figure 6B:
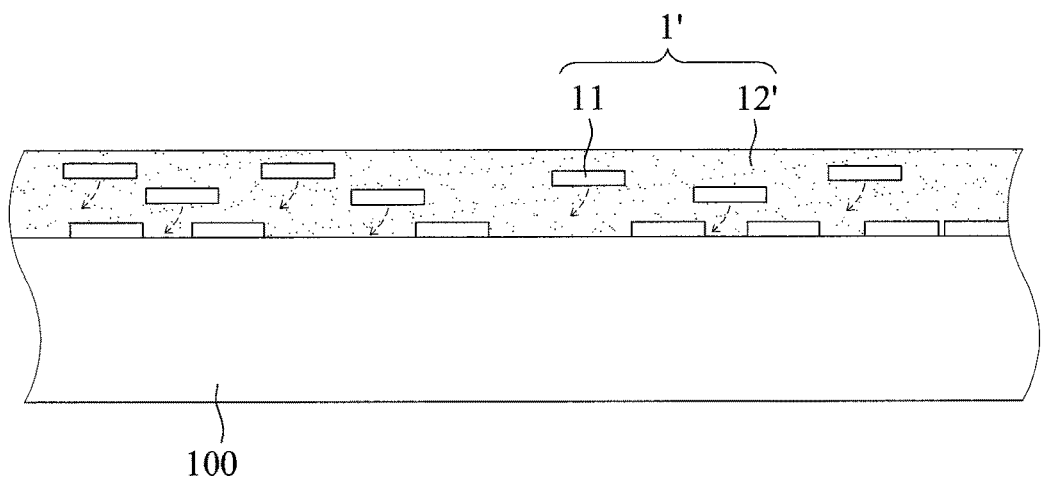
Figure 6C:
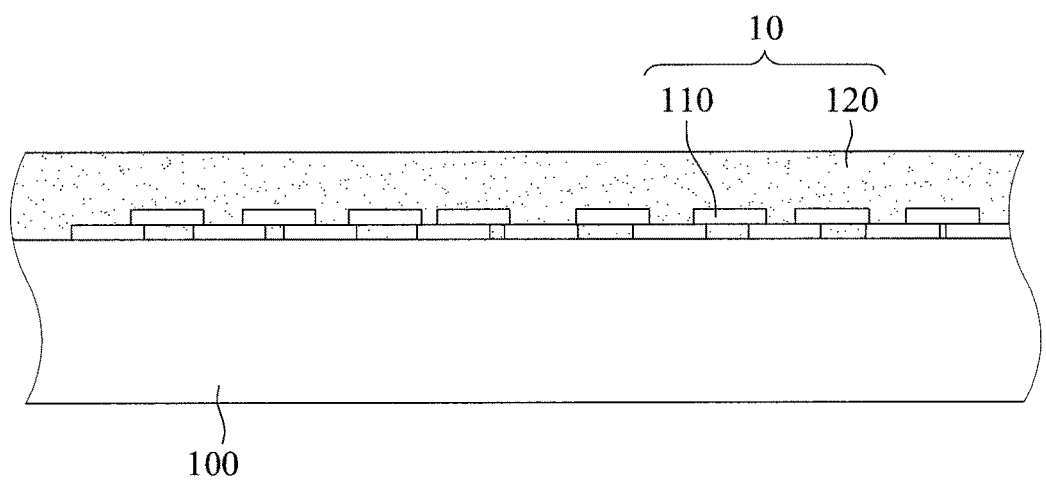

FIGS. 6A, 6B and 6C schematically illustrate steps of a method of using the graphene dispersion paste of the present application. As shown in FIG. 6A, the graphene dispersion paste 1 is prepared according to the aforesaid method of the present application, the graphene dispersion paste 1 includes graphene sheets 11 and a first polymer 12, the graphene sheets 11 are evenly dispersed in the first polymer 12, a viscosity of the graphene dispersion paste 1 is not less than 50,000 cps.

As shown in FIG. 6B, the graphene dispersion paste 1 is diluted with a solvent or a second polymer compatible with the first polymer 12, and a graphene dispersion solution 1' of a viscosity not greater than 5,000 cps is formed; the graphene dispersion solution 1' is applied to a substrate 100, and expanded along a surface of the substrate 100. The diluted first polymer (or the first polymer and the second polymer) 12', which restores fluidity, drags the graphene sheets 11 to dispersedly descend without agglomeration; a distance of each the graphene sheet 11 moving on a direction parallel to the surface of the substrate 100 is proportional to a vertical distance between the graphene sheet 11 and the surface of the substrate 100 (a moving track of the graphene sheet 11 shown as dotted arrow symbol), so that all the graphene sheets 11 can be evenly distributed over the surface of the substrate 100.

As shown in FIG. 6C, the graphene dispersion solution 1' is cured by heating or light irradiating, and a graphene polymer composite structure 10 is formed, wherein a graphene layer 110 is formed by the graphene sheets 11 distributed over the surface of the substrate 100, the graphene layer 110 is adhered to the surface of the substrate 100 by the cured polymer layer 120. The graphene layer 110 can substantially increase electric and heat conductivity, mechanical strength and other properties of the polymer layer 120 and the substrate 100; therefore, the graphene polymer composite structure 10 combined with the substrate 100 can produce various performances better than conventional graphene composite materials.

In order to make the advantages of the graphene dispersion paste of the present application more apparent to the ordinarily skilled in the art, the operation method of each practical application will be explained in details with following exemplary embodiments.

The present application provides a graphene/resin/fiber composite material including a fiber cloth, graphene sheets and a resin layer, wherein the graphene sheets respectively are adhered to opposite two surfaces of the fiber cloth, the resin layer is coated over the graphene sheets. The fiber cloth can be carbon fiber cloth, glass fiber cloth, Kevlar fiber cloth or a combination thereof. The resin layer can be formed by heating or ultraviolet irradiating the resin to occur a polymerizing reaction or a cross-linking reaction, a material of the resin layer is, for example, an epoxy resin, a phenolic resin, a polyester resin or a combination thereof. Based on total weight of the graphene/resin/fiber composite material, the resin layer accounts for 25-55 wt %, the graphene sheets accounts for 0.01-5 wt %; and a ratio of lateral size of each the graphene sheet to the diameter of each the fiber is in a range from 0.1 to 10.

Embodiment 1: the graphene/resin/carbon fiber composite material, a method of preparing the graphene/resin/carbon fiber composite material includes steps as follows.

A preparing step: the graphene sheets of 8 wt % and an epoxy resin of 92 wt % are added into a homogenizer, and a mixture of a viscosity greater than 200,000 cps is formed after one hour mixing; the mixture of the graphene sheets and the epoxy resin is stirred by using a revolution/rotation stirrer at a rotation speed of 2,000 rpm and a revolution speed of 500 rpm, and a pseudo-plastic non-Newtonian fluid is formed after the stirrer continuously operated for three hours; the pseudo-plastic non-Newtonian fluid of the graphene sheets and the epoxy resin is placed in the dispersion apparatus, a pressure of 5 bar and a slit of 200 μm are set in a first dispersing process, the pseudo-plastic non-Newtonian fluid passes through the slit at a flowing velocity of 0.5 L/min in the first dispersing process, a pressure of 22 bar and a slit of 50 μm are set in a second dispersing process, the pseudo-plastic non-Newtonian fluid passes through the slit at a flowing velocity of 2.0 L/min in the second dispersing process, and a graphene dispersion paste is obtained; and the graphene dispersion paste is placed in a degassing machine, bubbles therein are discharged at a rotating speed of 1,000 rpm and a temperature of 60° C.

A pre-impregnating step, the graphene dispersion paste is diluted with the epoxy resin, and the graphene sheets accounts for 1 wt % of total weight of the diluted graphene dispersion paste; isophorone as a solvent is added into the diluted graphene dispersion paste to reduce a viscosity thereof, and a graphene dispersion solution of a viscosity about 1,000 cps is formed; carbon fiber clothes (commercial name: Formosa TC12K36) are impregnated in the graphene dispersion solution, and graphene/resin/carbon fiber prepregs are formed; the graphene/resin/carbon fiber prepregs are taken out of the graphene dispersion solution, and stood still to dry status at room temperature, a resin content of the graphene/resin/carbon fiber prepregs is 42 wt %.

A molding step: six of the graphene/resin/carbon fiber prepregs are stacked and placed in a mold; the six stacked graphene/resin/carbon fiber prepregs are molded at a heating temperature of 60° C. and an applied pressure of 1000 Kg/cm$^2$ in a vacuum circumstance; and a graphene/resin/carbon fiber composite material is obtained.

A comparative example: the graphene sheets and epoxy resin of same proportion as Embodiment 1 are dispersed only by the revolution/rotation stirrer according to the preparing step, and then a graphene/resin/carbon fiber prepreg as the comparative example is made only by the pre-impregnating step. Samples of a resin/carbon fiber composite material not containing graphene, the graphene/resin/carbon fiber composite material made by using the graphene dispersion paste of the present application, the comparative example of graphene/resin/carbon fiber prepreg (dispersed only by the revolution/rotation stirrer) are cut with a CNC machine; tensile strength, tensile modulus and bending modulus of the samples are measured according to the test method of ASTM D3039; and dispersion of the three composite materials are measured with the scraper fitness gauge, the measured results are shown in Table 1.

TABLE 1

| Sample | Scraper fitness | Tensile strength | Tensile modulus | Bending modulus |
| --- | --- | --- | --- | --- |
| Comparative example 1-1: the resin/carbon fiber composite (not containing graphene) | <5 μm | 1800 MPa | 133.3 GPa | 111.9 GPa |
| Embodiment 1: the graphene/resin/fiber composite material | 8 μm | 2201.6 MPa | 169.6 GPa | 138.1 GPa |
| Comparative example 1-2: the graphene/resin/fiber prepreg (dispersed only by the revolution/rotation stirrer) | 25 μm | — | — | — |

The epoxy resin of viscosity reduced can drag the graphene sheets evenly dispersed over the surfaces of the carbon fibers, the graphene sheets can be adhered to the surfaces of the carbon fibers by the cured epoxy. As shown in Table 1, in comparison with Comparative example 1-1, the graphene/resin/carbon fiber composite material of Embodiment 1 can enhance the mechanical strength on 15-20% averaged; due to the graphene sheets not evenly dispersed in the graphene/resin/carbon fiber prepreg of Comparative example 1-2, the scraper fitness thereof is obviously increased, it can be observed that significant irregularities on the coated surfaces of the carbon fiber clothes during the impregnating or coating step, and thus the subsequent molding step cannot be performed.

The present application provides an anti-static graphene rubber including a rubber, carbon black, zinc oxide, cotton yarn and graphene sheets. Based on total weight of the anti-static graphene rubber, the rubber accounts for 10-60 wt %, and the graphene sheets accounts for 0.001-6 wt %. A ratio of the lateral size of each the graphene sheet to a diameter of the cotton yarn is in a range from 0.1 to 10. The rubber can be formed by heating or ultraviolet irradiating to occur a polymerizing reaction or a cross-linking reaction; the rubber is, for example, nitrile rubber, hydrogenated nitrile rubber, silicon rubber, fluorine rubber, ethylene propylene diene monomer (EPDM) rubber, fluorosilicone rubber, butadiene styrene rubber, neoprene rubber, acrylic rubber, natural rubber, chlorosulfonated polyethylene rubber, butyl rubber, polyurethane rubber, or a combination thereof.

Embodiment 2: the anti-static graphene rubber, a method of preparing the anti-static graphene rubber includes steps as follows.

A preparing step: the graphene sheets of 8 wt % and an aromatic oil of 92 wt % are added into the homogenizer, a mixture of a viscosity greater than 50,000 cps is formed after one hour mixing; the mixture of the graphene sheets and the aromatic oil is stirred by using a revolution/rotation stirrer at a rotation speed of 2,000 rpm and a revolution speed of 500 rpm, a pseudo-plastic non-Newtonian fluid is formed after the stirrer continuously operated for three hours; the pseudo-plastic non-Newtonian fluid of the graphene sheets and the aromatic oil is placed in the dispersion apparatus, a pressure of 20 bar and a slit of 200 μm are set in a first dispersing process, the pseudo-plastic non-Newtonian fluid passes through the slit at a flowing velocity of 0.5 L/min in the first dispersing process, a pressure of 24 bar and a slit of 50 μm are set in a second dispersing process, the pseudo-plastic non-Newtonian fluid passes through the slit at a flowing velocity of 2.0 L/min in the second dispersing process, and a graphene dispersion paste is obtained; and the graphene dispersion paste is placed in a degassing machine, bubbles therein are discharged at a rotating speed of 1,000 rpm and a temperature of 60° C.

A mixing step: the graphene dispersion paste is diluted with the aromatic oil and siloxane to reduce a viscosity thereof to 10,000 cps, and a graphene dispersion solution is formed; the graphene dispersion solution added with neoprene of 100 part by weight, reinforcing carbon black of 60 part by weight and zinc oxide of 5 part by weight are stirred by using the revolution/rotation stirrer at a rotation speed of 2000 rpm and a revolution speed of 500 rpm, and a raw material dispersion solution is formed after the stirrer continuously operated for half an hours; the raw material dispersion is diluted with the aromatic oil and the siloxane to reduce a viscosity thereof to 3,000 cps; cotton yarn of 15 part by weight is added into the raw material dispersion, and a raw material of anti-static rubber is formed, wherein the graphene sheets accounts for 1-6 wt % based on total weight thereof.

A curing step: the raw material of anti-static rubber is heated or irradiated with ultraviolet to occur a polymerizing reaction or a cross-linking reaction, and an anti-static graphene rubber is formed. Due the viscosity of the raw material of anti-static rubber is reduced, binding force of the diluted rubber acting on the graphene sheets is reduced during the polymerizing reaction or the cross-linking reaction, the graphene sheets gradually descend over surfaces of the cotton yarn, and an electron mobility network of the graphene sheets through the reinforcing carbon black is formed; accordingly, electric conductivity of the cotton yarn is enhanced, so that anti-static characteristic of the rubber is increased. Resistance tests are performed to a rubber not containing graphene, the anti-static graphene rubbers of various graphene contents according to the method of the present application, and a graphene rubber in which the graphene sheets are dispersed only by the homogenizer and the revolution/rotation stirrer; and results of the resistance tests are shown in Table 2.

TABLE 2

| Sample | Graphene content | Resistance (M*ohm) |
|---|---|---|
| Embodiment 2-1: the anti-static graphene rubber | 1 wt % | 5.42 |
| Embodiment 2-2: the anti-static graphene rubber | 6 wt % | 0.65 |
| Comparative example 2-1: the rubber not containing graphene | 0 | 439 |
| Comparative 2-2: the graphene rubber (graphene sheets therein dispersed only by the homogenizer and the revolution/rotation stirrer) | 1 wt % | 48 |

As shown in Table 2, in comparison with the rubber of Comparative example 2-1, the anti-static graphene rubbers of Embodiments 2-1 and 2-2 have excellent anti-static effect; although the graphene rubber of Comparative example 2-2 has the same graphene content as the anti-static graphene rubber of Embodiment 2-1, the resistance of Comparative example 2-2 is higher than Embodiment 2-1 due to the graphene sheets in Comparative example 2-2 not evenly dispersed, and thus Comparative example 2-2 does not have the anti-static effect same as Embodiments 2-1 and 2-2.

The present application provides an anti-static graphene coating, including a carrier resin, graphene sheets and an additive, wherein the graphene sheets accounts for 0.01-5 wt % based on total weight. The carrier resin is selected from at least one of polyvinylidene fluoride, polymethylmethacrylate, polyethylene terephthalate, polyurethane, polyethylene oxide, polyacrylonitrile, polyacrylamide, polymethtlacrylate, polyvinylacetate, polyvinylpyrrolidone, polytetramethylene glycol diacrylate, polyimide, cellulose acetate, cellulose acetate butyrate, cellulose acetate propionate, ethyl cellulose, cyanoethyl cellulose, cyanoethyl polyvinyl alcohol, carboxymethyl cellulose, polyvinyl chloride, polyolefin and silicon resin. The additive is selected from at least one of a conductive assistant, a surfactant, a viscosity modifier, a coupling agent and a thixotropic agent.

Embodiment 3: the anti-static graphene coating, a method of preparing the anti-static graphene coating includes steps as follows.

A preparing step: the graphene sheets of 30 wt % and phthalate ester of 70 wt % are added into the homogenizer, a mixture of a viscosity greater than 50,000 cps is formed after one hour mixing; the mixture of the graphene sheets and the phthalate ester is stirred by using a revolution/rotation stirrer at a rotation speed of 2,000 rpm and a revolution speed of 500 rpm, and a pseudo-plastic non-Newtonian fluid is formed after the stirrer continuously operated for three hours; the pseudo-plastic non-Newtonian fluid of the graphene sheets and the phthalate ester is placed in the dispersion apparatus, a pressure of 15 bar and a slit of 200 μm are set in a first dispersing process, the pseudo-plastic non-Newtonian fluid passes through the slit at a flowing velocity of 0.5 L/min in the first dispersing process, a pressure of 22 bar and a slit of 50 μm are set in a second dispersing process, the pseudo-plastic non-Newtonian fluid passes through the slit at a flowing velocity of 2.0 L/min in the second dispersing process, and a graphene dispersion paste is obtained; and the graphene dispersion paste is placed in the degassing machine, bubbles therein are discharged at a rotating speed of 1,000 rpm and a temperature of 60° C.

A mixing step: the graphene dispersion paste is diluted with epoxy resin, phenolic resin or phthalate ester to reduce a viscosity thereof to 10,000 cps, and a graphene dispersion solution is formed; the graphene dispersion solution is mixed with polyvinyl chloride, epoxy resin, phenolic resin, phthalate ester, barium stearate, triphenyl phosphate and silica, then an anti-static coating is formed, wherein the polyvinyl chloride, the epoxy resin and the phenolic resin are as the carrier resin, the phthalate ester is as the viscosity modifier, the barium stearate, the triphenyl phosphate and the silica are as the adhesion enhancer.

A curing step: the anti-static graphene coating is coated over a surface of a glass substrate by using a blade, and baked at 150° C. in an oven or a hot plate for 30 minutes, and an anti-static graphene coating layer of 30 μm thickness is formed, wherein the polyvinyl chloride accounts for 60 wt %, the epoxy resin accounts for 10 wt %, the phenolic resin accounts for 10 wt %, the phthalate ester accounts for 10%, the barium stearate accounts for 2 wt %, the triphenyl phosphate accounts for 2.5 wt %, the calcium carbonate accounts for 2 wt %, the silica accounts for 2 wt %, and the graphene sheets accounts for 1.5 wt %, based on total weight of the anti-static graphene coating layer. Binding force of the diluted resin acting on the graphene sheets is reduced, and the graphene sheets cover the surface of the glass substrate to form an electron mobility network.

With a static electricity measuring machine and a surface impedance testing machine, surface resistance tests are performed to an anti-static coating layer not containing graphene, the anti-static graphene coating layer of Embodiment 3 and an anti-static coating layer containing the graphene sheets being of a weight content same as Embodiment 3 and dispersed only by the homogenizer and the revolution/rotation stirrer; and results of the surface resistance tests are shown in Table 3.

TABLE 3

| Sample | Peeling static voltage (kV) | Surface resistance (ohm/sq.) | Light transmittance (%) (at wavelength 550 nm) |
|---|---|---|---|
| Embodiment 3: the anti-static graphene coating layer | 0.59 | $8.77*10^9$ | 65 |
| Comparative example 3-1: the anti-static coating layer not containing graphene | 4.20 | $>2*10^{12}$ | 83 |
| Comparative example 3-2: the anti-static coating layer containing graphene (the graphene sheets therein only dispersed by the homogenizer and the revolution/rotation stirrer) | 2.1 | $1.07*10^{11}$ | 62 |

As shown in Table 3, in comparison with Comparative example 3-1 (the anti-static coating layer not containing graphene), the anti-static graphene coating layer of Embodiment 3 has excellent anti-static effect; although Comparative example 3-2 has the graphene sheets weight content same as Embodiment 3, the resistance of Comparative example 3-2 is higher than Embodiment 3, and the light transmittance of Comparative example 3-2 is slightly lower than Embodiment 3 due to the graphene sheets in Comparative example 3-2 not evenly dispersed.

The present application provides a conductive graphene coating layer including graphene sheets, a carrier resin and a conductive filler, wherein the graphene sheets connect to the conductive filler to form a conductive network, the carrier resin covers the graphene sheets and the conductive filler. Based on total weight of the conductive graphene coating layer, the graphene sheets accounts for 0.1-30 wt %, the conductive filler accounts for 10-50 wt %, and the carrier resin accounts for 10-50 wt %. A substrate on which the conductive graphene coating layer is coated can be selected from insulation materials or metal foils, the insulation materials can be selected from one of polyethylene terephthalate, polyimide, epoxy resin and phenolic resin, the metal foils can be selected from one of aluminum foil, copper foil, titanium foil and nickel foil. The conductive filler can be conductive carbon black, carbon nanotube, or a combination thereof.

Embodiment 4: a graphene current collecting layer, a method of preparing the graphene current collecting layer includes steps as follows.

A preparing step: the graphene sheets, a conductive filler and NMP are added into the homogenizer, and a graphene sheets/conductive filler mixture solution is formed; the graphene sheets/conductive filler mixture solution and a carrier resin are stirred by using a revolution/rotation stirrer at a rotation speed of 1,000 rpm and a revolution speed of 400 rpm, a pseudo-plastic non-Newtonian fluid of a viscosity greater than 200,000 cps is formed after the stirrer continuously operated for an hour; the pseudo-plastic non-Newtonian fluid of the graphene sheets, the conductive filler and the carrier resin is placed in the dispersion apparatus, a pressure of 20 bar and a slit of 150 μm are set in a first dispersing process, the pseudo-plastic non-Newtonian fluid passes through the slit at a flowing velocity of 1 L/min in the first dispersing process, a pressure of 24 bar and a slit of 30 μm are set in a second dispersing process, the pseudo-plastic non-Newtonian fluid passes through the slit at a flowing velocity of 2.0 L/min in the second dispersing process, and a graphene dispersion paste is obtained.

A diluting step: the graphene dispersion paste is diluted with NMP in a centrifuge at a rotating speed from 200 to 2,000 rpm, a viscosity of the diluted graphene dispersion paste is reduced to not greater than 1,000 cps, and a graphene dispersion solution is formed.

A curing step: the graphene dispersion solution is coated on an aluminum foil substrate, the NMP therein is heated to volatilize, and a conductive graphene layer of 0.1-5 μm thickness is formed. Binding force of the diluted carrier resin acting on the graphene sheets is reduced, the graphene sheets restore fluidity in the diluted carrier resin, and the conductive filler not only prevents the graphene sheets from agglomeration, but also connects to the graphene sheets to form a conductive network. Polyvinylidene fluoride (PVDF) is used as the carrier resin of Embodiments 4-1 to 4-5, and epoxy resin is used as the carrier resin of Embodiment 4-1 and 4-2. Proportions of the graphene sheets, the conductive filler and the NMP of Comparative examples 4-1 and 4-2 are respectively identical to Embodiments 4-5 and 4-7, the conductive graphene coating layers of Comparative examples 4-1 and 4-2 are formed only by mixing the graphene sheets, the conductive filler and the NMP in the homogenizer without performing the subsequent dispersing processes. The conductive graphene coatings layers of Embodiments and Comparative examples are respectively coated and cured on substrates, and can be used as a current collecting layer of battery.

Adhesion test (Cross-cut test) is performed to the conductive graphene coating layers by using 3M tapes of type 600 and 610, the test results are that adhesion strength of the conductive graphene coating layers of Embodiments are not less than 4B. Resistances of the conductive graphene coating layer of various compositions and thicknesses are measured with four-point probe. The test results are shown in Table 4.

| Sample | Weight percentage of the carrier resin (based on total weight) | Thickness of the conductive graphene coating layer (μm) | Resistance (Ω-cm) | Material of the substrate |
|---|---|---|---|---|
| Embodiment 4-1 | 46 | 2 | $8.34*10^{-1}$ | Aluminum foil |
| Embodiment 4-2 | 24 | 2 | $6.00*10^{-4}$ | Aluminum foil |
| Embodiment 4-3 | 24 | 1 | $2.98*10^{-4}$ | Aluminum foil |
| Embodiment 4-4 | 12 | 2 | $2.95*10^{-5}$ | Aluminum foil |
| Embodiment 4-5 | 12 | 1 | $2.10*10^{-6}$ | Aluminum foil |
| Comparative example 4-1 | 12 | 1 | $4.65*10^{-6}$ | Aluminum foil |
| Embodiment 4-6 | 45 | 2 | $3.56*10^{-2}$ | Polyethylene terephthalate |
| Embodiment 4-7 | 45 | 1 | $4.10*10^{-2}$ | Polyethylene terephthalate |
| Comparative example 4-2 | 45 | 1 | $1.23*10^{-1}$ | Polyethylene terephthalate |

As shown in Table 4, in Embodiments 4-1 to 4-7, the conductive network formed by the graphene sheets and the conductive filler has extremely low resistances, so that can dramatically improve the conductivity of the current collecting layer; the carrier resin can enhance the adhesion of the conductive network to the substrate, and effectively reduce interface impedance between the current collecting layer and the electrode active material; the resistances of the conductive graphene coating layers of Comparative examples 4-1 and 4-2 are obviously 2 to 3 times higher than the resistances of Embodiments 4-5 and 4-5, it shows the advantage of the graphene dispersion paste of the present application for constructing the conductive network.

Figure 7:
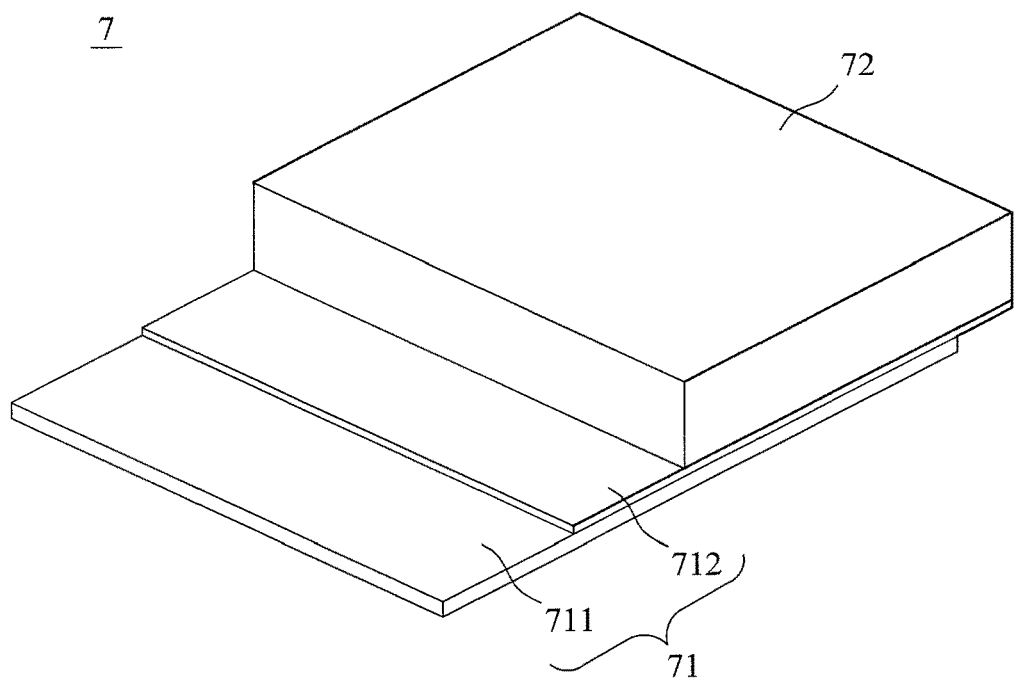
FIG. 7 schematically illustrates a structure of the graphene current collecting layer of the present application applied to a super capacitor.

FIG. 7 schematically illustrates a structure of the graphene current collecting layer of the present application applied to a super capacitor. As shown in FIG. 7, a super capacitor 7 includes a current collecting layer 71 and an active material layer 72, wherein a composition of the current collecting layer 71 is as Embodiment 4-3 shown in Table 4, a thickness of the aluminum foil 711 is about 15-16 μm, a thickness of the conductive graphene coating layer 712 is about 1-2 μm; a material of the active material layer 72 is active carbon. Capacitances of the super capacitor 7 using the current collecting layer of the present application and the conventional super capacitor only using the aluminum foil as the current collecting layer are measured under various current densities, to compare charge/discharge performance of the two super capacitors.

Figure 8:
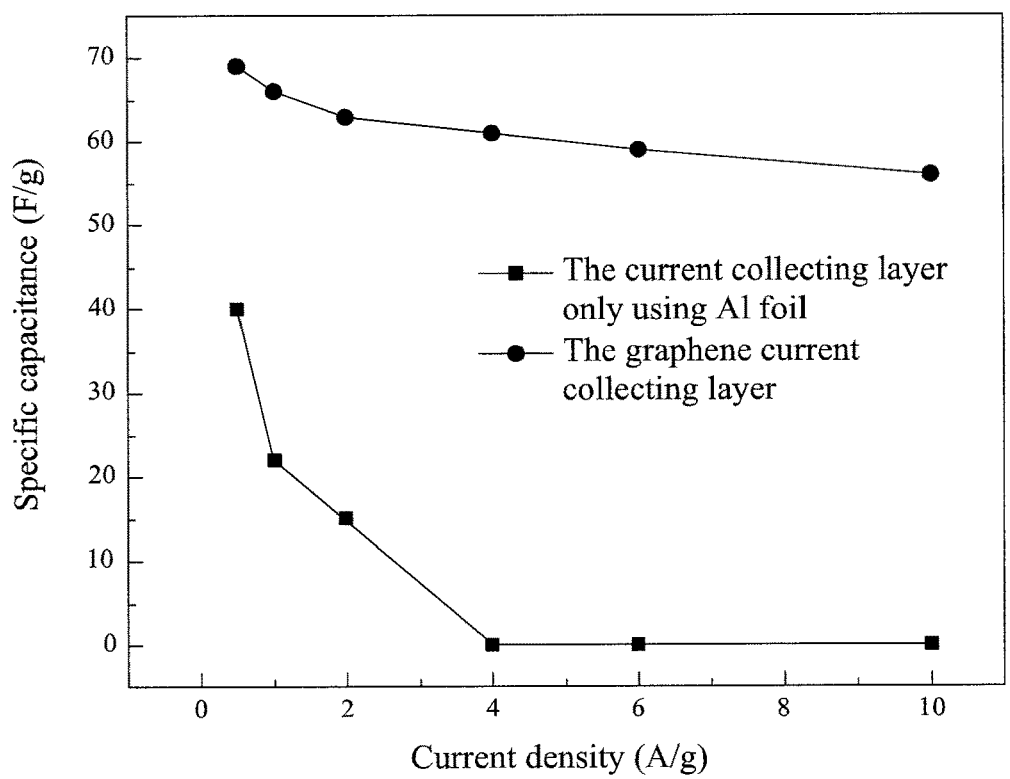
FIG. 8 is a point plot graph illustrating specific capacitance vs. current density of the super capacitor using the graphene current collecting layer and the conventional super capacitor only using the aluminum foil as the current collecting layer.

FIG. 8 is a point plot graph illustrating specific capacitance vs. current density of the super capacitor using the graphene current collecting layer and the conventional super capacitor only using the aluminum foil as the current collecting layer. As shown in FIG. 8, under the test condition of increasing the current density from 0.5 A/g to 10 A/g, the specific capacitance of the conventional super capacitor is seriously attenuated, when the current density exceeds 4 A/g, the specific capacitance thereof decays to zero; under the test condition of increasing the current density from 0.5 A/g to 10 A/g, the specific capacitance of the super capacitor using the current collecting layer of the present application can maintain more than 80% of the highest value. Alternating-current impedances of the two super capacitors are further measured, so as to analyze the reason of charge/discharge performance difference between the two super capacitors.

Figure 9:
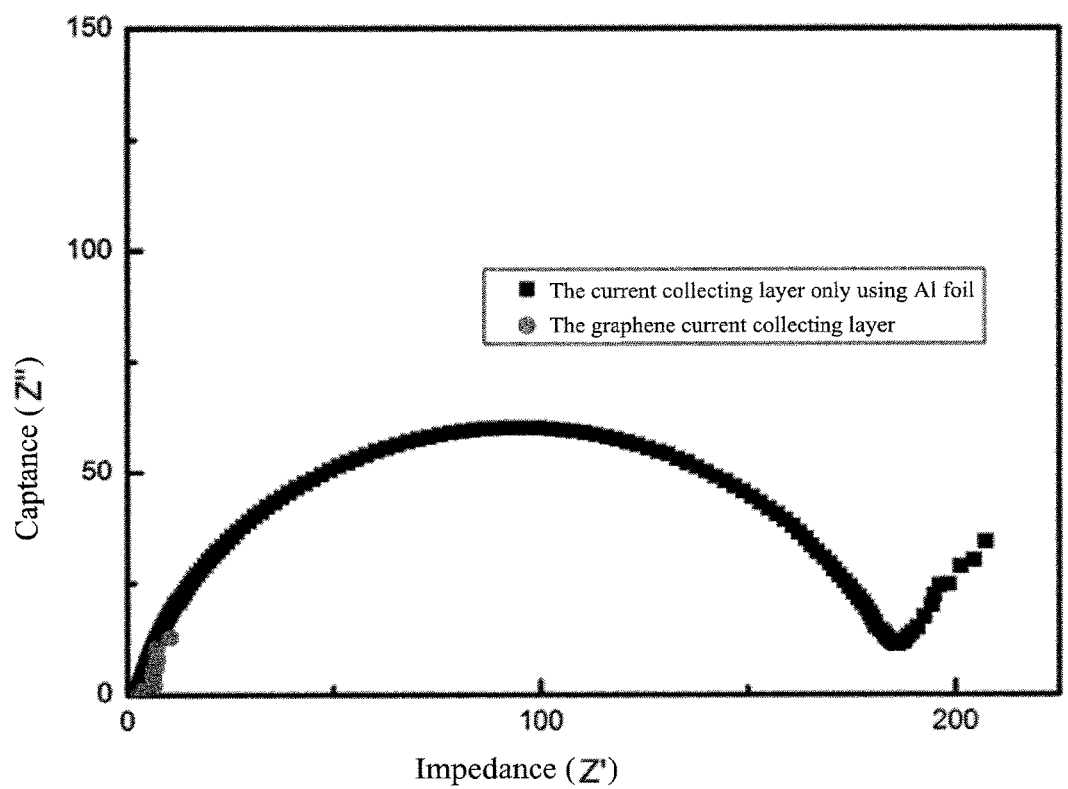
FIG. 9 is a diagram illustrating captance (Z") vs. impedance (Z') of the super capacitor using the graphene current collecting layer and the conventional super capacitor only using the aluminum foil as the current collecting layer.

FIG. 9 is a diagram illustrating captance (Z") vs. impedance (Z') point plot graph of the super capacitor using the graphene current collecting layer and the conventional super capacitor only using the aluminum foil as the current collecting layer. As shown in FIG. 9, in the conventional super capacitor, the interface impedance between the active material layer and the current collecting layer is too large, polarization occurring at the interface under high current density results in being inoperable; in contrast, in the super capacitor using the graphene current collecting layer of the present application, the interface impedance between the conductive graphene coating layer and the active material layer is reduced to about 1/40 of the interface impedance of the conventional super capacitor. From the difference between the two impedances thereof, it can be seen that operation range of the current density of the super capacitor can be greatly improved by using the graphene current collecting layer of the present application.

The present application provides a graphene electrode material including graphene sheets, a conductive filler, a solvent and a resin, wherein the graphene sheets and the conductive filler are dispersed in the solvent, the resin adheres to the graphene sheets and the conductive filler. Based on total weight of the graphene electrode material, the graphene sheets accounts for 0.1-20 wt %, the conductive accounts for 1-30 wt %, the solvent accounts for 50-95 wt %, and the resin accounts for 0.01-5 wt %. The conductive filler can be conductive carbon black, carbon nanotube, or a combination thereof, a ratio of a diameter of the conductive filler to a thickness of the graphene sheet is from 2 to 1,000.

Embodiment 5: the graphene electrode material, a method of preparing the graphene electrode material includes steps as follows.

A preparing step: the graphene sheets, a conductive filler and NMP are added into the homogenizer, and a graphene sheets/conductive filler mixture solution is formed; the graphene sheets/conductive filler mixture solution and PVDF are stirred by using a revolution/rotation stirrer at a rotation speed of 800 rpm and a revolution speed of 300 rpm, and a pseudo-plastic non-Newtonian fluid of a viscosity greater than 200,000 cps is formed after the stirrer continuously operated for an hour; the pseudo-plastic non-Newtonian fluid of the graphene sheets, the conductive filler and the PVDF is placed in the dispersion apparatus, a pressure of 18 bar and a slit of 200 μm are set in a first dispersing process, the pseudo-plastic non-Newtonian fluid passes through the slit at a flowing velocity of 2 L/min in the first dispersing process, a pressure of 24 bar and a slit of 50 μm are set in a second dispersing process, the pseudo-plastic non-Newtonian fluid passes through the slit at a flowing velocity of 2.5 L/min in the second dispersing process, and a graphene dispersion paste is obtained.

A mixing step: the graphene dispersion paste is diluted with NMP in a centrifuge at a rotating speed from 200 to 2,000 rpm, a viscosity of the diluted graphene dispersion paste is reduced to not greater than 500 cps, and a graphene dispersion solution is formed; the graphene dispersion, an active material (lithium ion compounds, for example: lithium nickel-cobalt-manganese oxide, LiNCM oxide) are mixed in a centrifuge foam breaker, and a graphene electrode material is formed.

Figure 10:
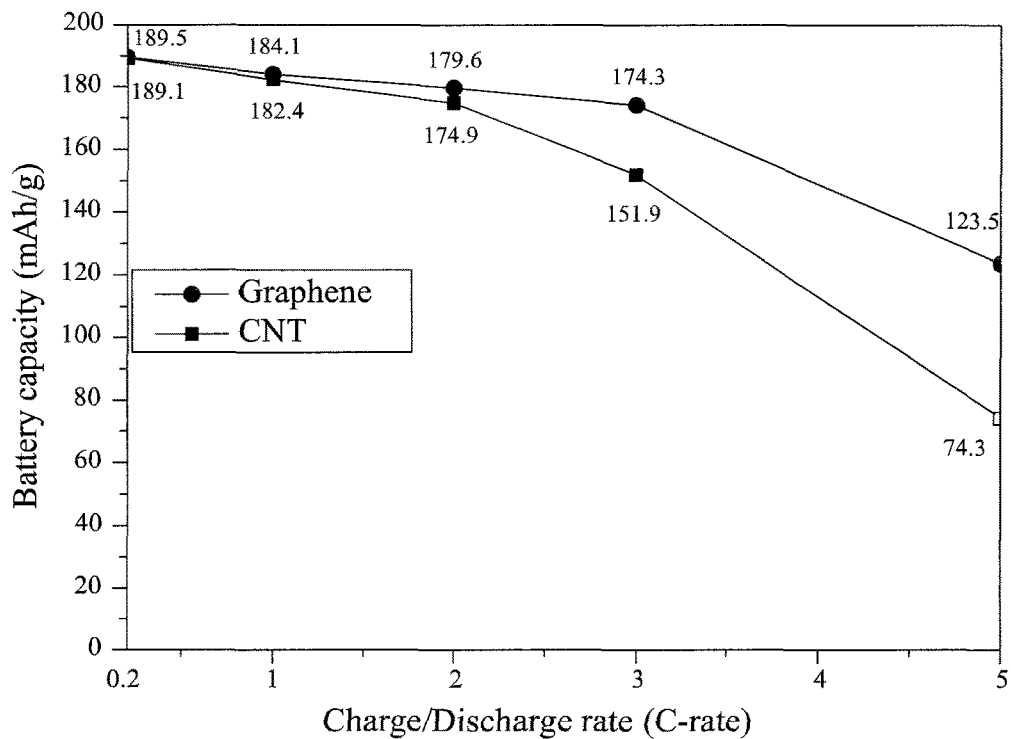
FIG. 10 is a point plot graph illustrating measured results of battery capacity vs. charge/discharge rate of LiNCM oxide half-cells respectively made by using the graphene electrode material and carbon nanotube (CNT) electrode material.
Figure 11:
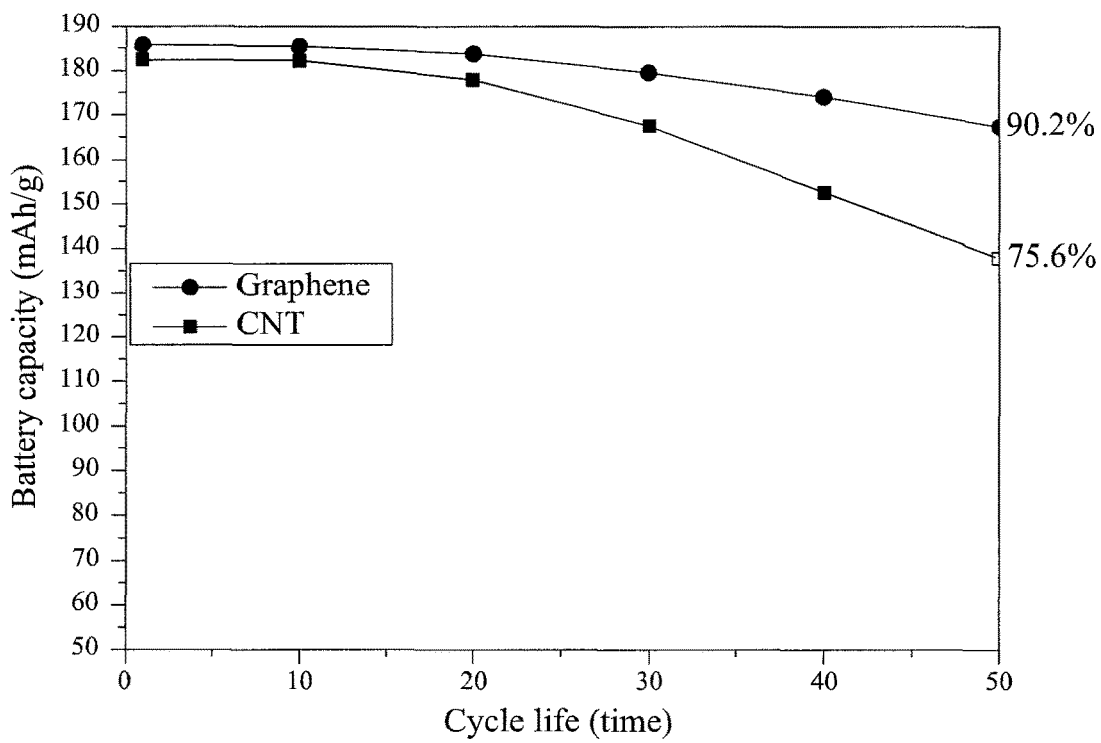
FIG. 11 is a point plot graph illustrating measured results of battery capacity vs. cycle life (at 1 C rate) of LiNCM oxide half-cells respectively made by using the graphene electrode material and carbon nanotube (CNT) electrode material.

A curing step: the graphene electrode material is coated on a substrate, the NMP therein volatilizes under vacuum-pumping, and an electrode is formed. LiNCM oxide half-cells are respectively made by using the graphene electrode material and carbon nanotube (CNT) electrode material, battery capacity vs. charge/discharge rate and cycle life (at 1 C rate) of the two LiNCM oxide half-cells are measured, the measured results are shown in FIGS. 10 and 11.

In this Embodiment, the dispersed graphene sheets are adhered to surfaces of the electrode active material, and connect to the conductive filler to form a charge/discharge network for the electrode active material; the resin has functions of dispersing the graphene sheets and bonding the charge/discharge network. As shown in FIGS. 10 and 11, in comparison with the CNT electrode material, the graphene electrode material of the present application can effectively enhance the charge/discharge efficiency and cycle life.

In summary, the present application utilizes the fluid properties of polymer, a pseudo-plastic non-Newtonian fluid having a viscosity greater than 50,000 cps is formed by mixing the graphene and the polymer, an pressure in a range from 10 to 30 bar is applied to the pseudo-plastic non-Newtonian fluid, to allow pseudo-plastic non-Newtonian fluid pass a slit having a clearance in a range from 10 to 1,000 μm at least two times, the viscosity of the polymer is suddenly decreased under an action of high shear force that is formed by the slit so as to evenly disperse the graphene sheets; the polymer, which passed through the slit and restored the original viscosity, can effectively prevent the graphene sheets from agglomeration, and keep the graphene sheets in dispersed status for a long time. On using the graphene dispersion paste of the present application, the viscosity of the graphene dispersion paste can be adjusted by adding a solvent or a compatible polymer, and flowing direction and rate of the graphene sheets can be controlled thereby, so that the graphene sheets can be dispersedly adhered to a surface of a material. Accordingly, the graphene dispersion paste truly has practical industrial utilization to be used for technical fields of fiber, rubber, electrochemistry and others.

The exemplary embodiments described above only illustrate the principles and effects of the present application, but are not intended to limit the scope of the present application. Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A method of preparing a graphene dispersion paste, comprising:
   mixing and stirring graphene sheets, a solvent and a polymer to form a pseudo-plastic non-Newtonian fluid, wherein each of the graphene sheets is consisting of 2 to 30 stacked graphene layers, and has a bulk density in a range from 0.005 to 0.05 g/cm$^3$, a thickness in a range from 0.68 to 10 nm, and a lateral size in a range from 1 to 100 μm; and
   applying a pressure not less than 10 bar to the pseudo-plastic non-Newtonian fluid, allowing the pseudo-plastic non-Newtonian fluid pass through a slit of a clearance not greater than 1,000 μm at least two times, then forming a graphene dispersion paste, wherein a viscosity of the pseudo-plastic non-Newtonian fluid passing through the slit is in a range from 10 to 10,000 cps, and a viscosity of the graphene dispersion paste is in a range from 50,000 to 350,000 cps.

2. The method of preparing the graphene dispersion paste according to claim 1, wherein the graphene sheets account for 0.05 to 20 wt % of total weight of the pseudo-plastic non-Newtonian fluid.

3. The method of preparing the graphene dispersion paste according to claim 1, wherein each surface of the graphene sheets has a functional group represented by Rx-R'y, R is selected from a group consisting of benzene ring, pyridine and triazine, R' is selected from a group consisting of amino, alkoxyl, carbonyl, carboxyl, acyloxyl, amido, alkoxylene, dimethylamino and alkoxylenecarboxyl, $1 \leq x \leq 4$, and $1 \leq y \leq 6$.

4. The method of preparing the graphene dispersion paste according to claim 1, wherein the pressure is sequentially increased in a range from 10 to 30 bar, and the clearance of the slit is sequentially decreased in a range from 1000 to 10 μm at the same time.

5. The method of preparing the graphene dispersion paste according to claim 1, further comprising: heating the graphene dispersion paste at a temperature in a range from 30 to 200° C., reducing the viscosity of the graphene dispersion paste from 50,000 to 10,000 cps, discharging bubbles in the graphene dispersion paste of reduced viscosity by centrifugal force, and increasing the viscosity of the graphene dispersion paste not less than 50,000 cps.

6. A method of using a graphene dispersion paste, comprising:
preparing a graphene dispersion paste according to the method of claim 1, the graphene dispersion paste having a grind fineness not greater than 20 μm, and comprising the graphene sheets, the solvent and a first polymer;
diluting the graphene dispersion paste to form a graphene dispersion solution of a viscosity not greater than 50,000 cps;
applying the graphene dispersion solution to a substrate, allowing the graphene sheets dispersedly descend over a surface of the substrate; and
curing the graphene dispersion solution, allowing the graphene sheets adhered to the surface of the substrate by the first polymer.

7. The method of using the graphene dispersion paste according to claim 6, wherein the graphene dispersion paste is diluted with a solvent or a second polymer compatible with the first polymer to form the graphene dispersion solution; after the graphene dispersion solution is cured, the graphene sheets are adhered to the surface of the substrate by the first polymer and the second polymer.

8. The method of using the graphene dispersion paste according to claim 6, during the step of diluting the graphene dispersion paste, an electric conductive filler is further added in the graphene dispersion paste to form the graphene dispersion solution; after the graphene dispersion solution is cured, the graphene sheets connect with the electric conductive filler to form an electric conductive network.

9. A graphene dispersion paste, having a viscosity in a range from 50,000 to 350,000 cps and a grind fineness not greater than 20 μm, and comprising: graphene sheets, a solvent and a first polymer, wherein the graphene sheets accounts for 0.05 to 20 wt % of total weight of the graphene dispersion paste, and each of the graphene sheets has a bulk density in a range from 0.005 to 0.05 g/cm$^3$, a thickness in a range from 0.68 to 10 nm, and a lateral size in a range from 1 to 100 μm.

10. The graphene dispersion paste according to claim 9, wherein each surface of the graphene sheets has a functional group represented by Rx-R'y, R is selected from a group consisting of benzene ring, pyridine and triazine, R' is selected from a group consisting of amino, alkoxyl, carbonyl, carboxyl, acyloxyl, amido, alkoxylene, dimethylamino and alkoxylenecarboxyl, $1 \leq x \leq 4$, and $1 \leq y \leq 6$.

* * * * *